United States Patent [19]
Cheong

[11] Patent Number: 6,140,781
[45] Date of Patent: Oct. 31, 2000

[54] CONTROL METHOD AND APPARATUS FOR DRIVING A HEAD DRUM ASSEMBLY OF A VIDEO CASSETTE RECORDER

[75] Inventor: Man-Sheel Cheong, Seoul, Rep. of Korea

[73] Assignee: Daewoo Electronics Co., Ltd., Seoul, Rep. of Korea

[21] Appl. No.: 09/067,962

[22] Filed: Apr. 29, 1998

[30] Foreign Application Priority Data

Jun. 25, 1997 [KR] Rep. of Korea ........................ 97-27001
Jun. 25, 1997 [KR] Rep. of Korea ........................ 97-27002

[51] Int. Cl.[7] .................................................. H02K 23/00
[52] U.S. Cl. ........................ 318/254; 318/138; 318/439; 318/245
[58] Field of Search ........................................ 318/254, 138, 318/439, 245

[56] References Cited

U.S. PATENT DOCUMENTS

| | | | |
|---|---|---|---|
| 4,672,274 | 6/1987 | Suganuma | 318/254 |
| 5,089,733 | 2/1992 | Fukuoka | 310/67 R |
| 5,907,225 | 5/1999 | Kim | 318/254 |
| 5,998,946 | 12/1999 | Kim | 318/254 |

FOREIGN PATENT DOCUMENTS

2 250 613  6/1992  United Kingdom .

*Primary Examiner*—Karen Masih
*Attorney, Agent, or Firm*—Pillsbury Madison & Sutro LLP

[57] ABSTRACT

A control method and an apparatus for precisely driving a motor of a head drum assembly by using impulse generation magnets in a video cassette recorder is disclosed. While a displacement of a hall sensor installed on a stator side is produced with respect to magnetic fluxes generated from impulse generation magnets installed on frequency generator magnets of a rotor, an impulse detection signal is supplied from the hall sensor. After a zero-crossing signal obtained by executing a zero-crossing detecting process with respect to the impulse detection signal is compared by a driving controller with a count signal obtained by counting a pulse number of the impulse detection signal, a next drive order of a switching section for driving the motor with reference to a present position of rotary magnets of the rotor is determined, and a rotational position of the motor is precisely controlled according to the rotational speed control signal which is computed on the basis of the determined drive order. Consequently, an operating reliability of the motor is improved. Also, a number of the hall sensors for detecting a rotational position of the motor is reduced, thereby reducing a unit cost of manufacturing.

17 Claims, 11 Drawing Sheets

CONTROL METHOD AND APPARATUS FOR DRIVING A HEAD DRUM ASSEMBLY OF A VIDEO CASSETTE RECORDER

BACKGROUND OF THE INVENTION

1. Field of the Invention

The present invention relates to a control method and an apparatus for precisely driving a motor of a head drum assembly by using impulse generation magnets in a video cassette recorder.

2. Description of the Prior Art

Generally, a video cassette recorder is an apparatus for recording video/audio signals onto a magnetic tape and for reproducing the recorded signals. The video cassette recorder includes a main base. A driving system is mounted on the main base and draws the tape from a cartridge to run the tape around the outer surface of the head drum according to a predetermined route. A head drum assembly is utilized for recording the video signals onto the tape and for reproducing the recorded video signals.

Figure 1:
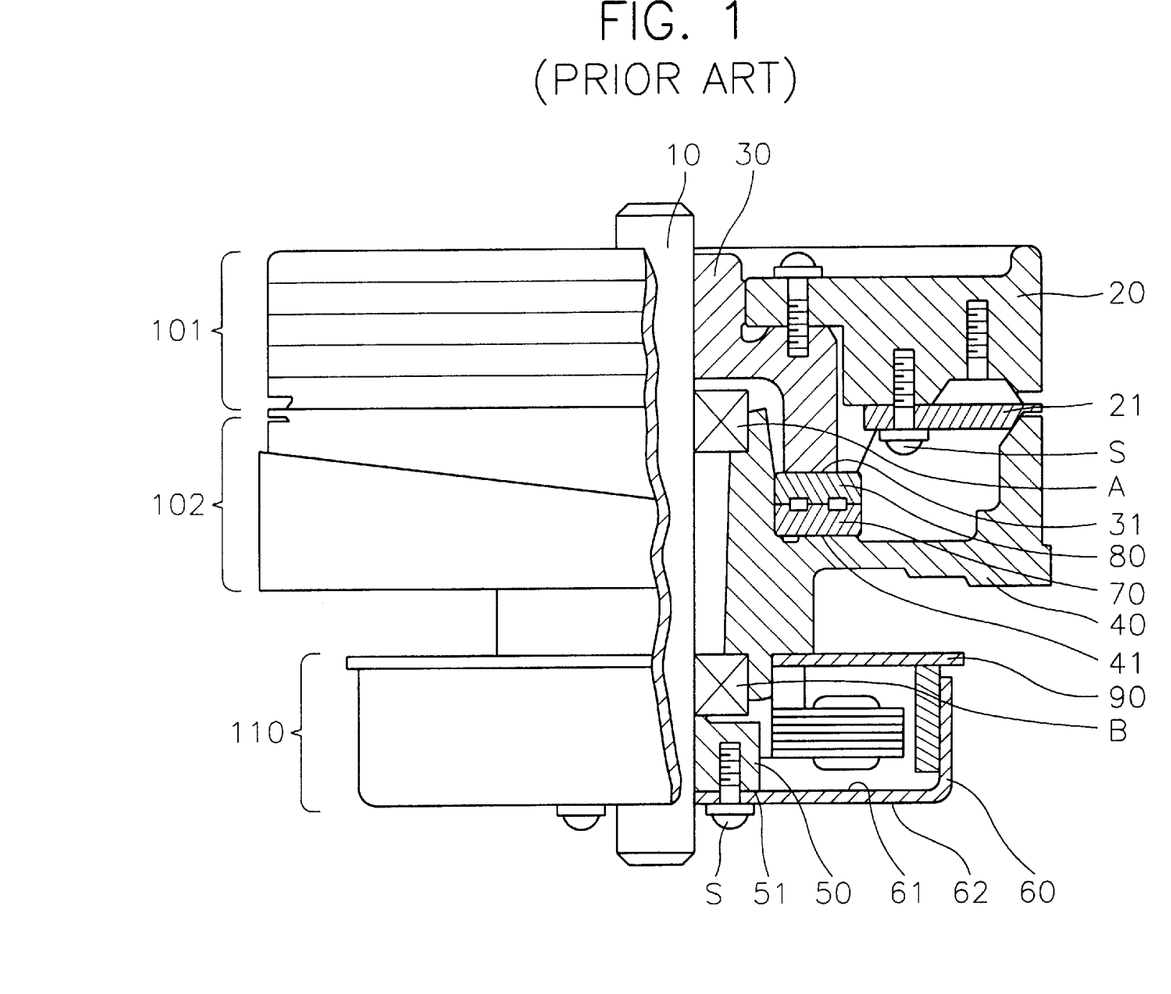
FIG. 1 is a lateral cross-sectional view for showing a structure of a conventional head drum assembly for use in a video cassette recorder.

FIG. 1 is a lateral cross-sectional view for showing a structure of a conventional head drum assembly for use in a video cassette recorder. As shown in FIG. 1, the head drum assembly comprises a rotating shaft 10 divided into an upper part 101, and a lower part 102, a rotary drum 20, a plurality of heads 21, a flange 30 with a bottom surface 31, a stationary drum 40 having a top surface 41, a pre-pressing boss 50 having a bottom surface 51, a rotor 60 having a top and lower bottom surfaces 61 and 62, a stator transformer 70, a rotor transformer 80, a stator 90, and an upper and a lower set of bearings A and B.

At the lower surface of stationary drum 40, a motor 110 including rotor 60 and stator 90 for generating the rotational force is installed. Rotating shaft 10 transmits the rotational force of motor 110 to rotary drum 20, and is rotatably inserted into rotary drum 20 and stationary drum 40. Both stator transformer 70 and rotor transformer 80 are installed between rotary drum 20 and stationary drum 40. Rotor transformer 80 is connected to rotary drum 20, and stator transformer 70 is connected to stationary drum 40.

In a reproducing mode of the VCR, the video signals reproduced by heads 21 are transmitted to an external device, e.g., an amplifier, via stator transformer 70 from rotor transformer 80 by an induction between rotor transformer 80 and stator transformer 70. On the other hand, in a recording mode of the VCR, the video signals reproduced by heads 21 are transmitted to heads 21, e.g., an amplifier, via rotor transformer 80 from stator transformer 70 by an induction between rotor transformer 80 and stator transformer 70. Accordingly, heads 21 which are mounted on the head drum assembly records or reproduces the video signals onto/from the magnetic tape.

U.S. Pat. No. 5,677,816 granted to Oh discloses a head drum assembly which is capable of preventing a resonance caused by an electrical or mechanical disturbance having a frequency which is similar to a natural vibration frequency of the head drum assembly.

Figure 2:
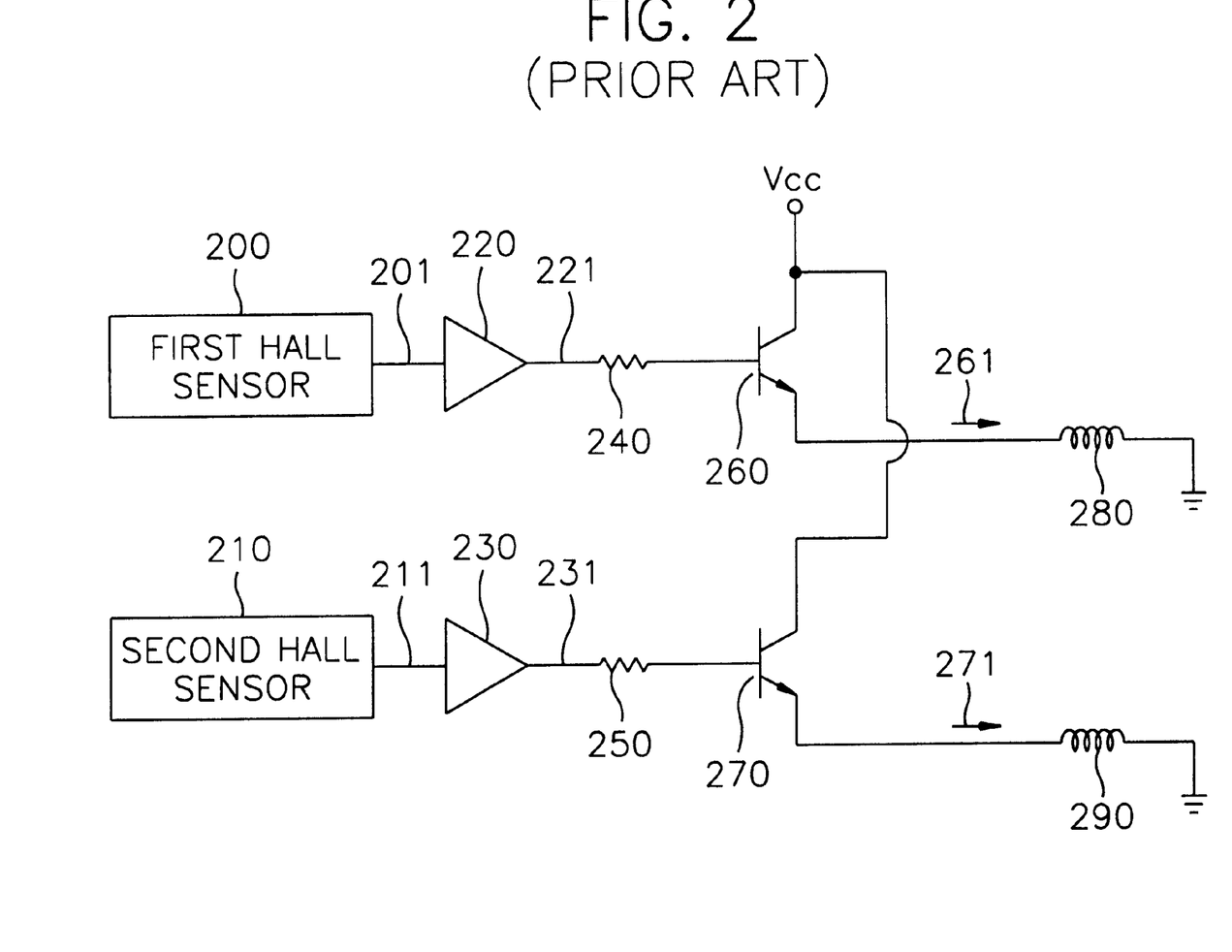
FIG. 2 is a block diagram for showing a circuit configuration of a driving apparatus of the head drum assembly shown in FIG. 1.

FIG. 2 is a block diagram for showing a circuit configuration of a driving apparatus of the head drum assembly shown in FIG. 1. As shown in FIG. 2, the driving apparatus of the head drum assembly includes a plurality of hall sensors 200 and 210 which detect a relative rotational position of rotor 60 in accordance with a predetermined interval of a rotational angle.

A plurality of amplifiers 220 and 230 which are respectively connected to output terminals of the plurality of hall sensors 200 and 210, amplify a plurality of rotor position signals 201 and 211 detected by hall sensors 200 and 210 to a plurality of predetermined signal levels, and provides a plurality of amplified rotor position detection signals 221 and 231. Amplifiers 220 and 230 are respectively connected to a plurality of driving transistors 260 and 270 via a plurality of resistors 240 and 250. Driving transistors 260 and 270 respectively provide a plurality of exciting currents 261 and 271 to a plurality of magnetic coils 280 and 290 of stator 90 in response to amplified rotor position detection signal 221 and 231.

A plurality of frequency generator (hereinafter, referred to as "FG") magnets (not shown) for detecting a rotational position of rotor 60 are securely attached to an inner peripheral surface of a frame of rotor 60, and a plurality of hall sensors 200 and 210 which generate detection voltages in response to magnet forces of the FG magnets, are disposed in an opposite position to the FG magnets.

When the exciting currents are sequentially supplied to magnetic coils 280 and 290 of stator 90, rotor 60 continually rotates. Then, the FG magnets of rotor 60 come to rotate and provide to a control section (not shown) rotor position signals 201 and 211 which are detected by hall sensors 200 and 210. The control section controls the rotational speed of the motor of the head drum assembly based on detected rotor position signals 201 and 211.

In the above-described conventional video tape recorder, in the recording of the audio/video signals on the magnetic tape, the motor of the head drum assembly has to rotate in a stable state so as not to change a timing in a graph which depicts a signal magnitude vs. a time of the signal to be recorded. Thus, in the case where the signal is reproduced from the magnetic tape after it is recorded on the magnetic tape, in order to continually generate an ideal track timing of the magnetic tape, both the rotational speed of the head drum assembly and a running speed of the magnetic tape have to be maintained the same as in the recording.

Furthermore, since the hall sensors for detecting the rotational speed of the rotor have a relatively high price, the unit price increases in the manufacturing of the driving apparatus of the head drum assembly. Also, a reserved room is demanded in order for the hall sensors to be installed on a printed-circuit board which is secured onto a stator side of the head drum assembly.

SUMMARY OF THE INVENTION

Therefore, it is an object of the present invention to provide an apparatus wherein impulse generation magnets can be securely installed onto frequency generator magnets in a various structure in a motor of a head drum assembly, and thereby detecting magnetic fluxes generated by the impulse generation magnets via a hall sensor.

It is another object of the present invention to provide an apparatus which determines a drive order of switching means for driving a motor of a head drum assembly, and controls a rotational speed of the motor in a determined drive order.

It is a further object of the present invention to provide an apparatus wherein a number of hall sensors for detecting a rotational position of a motor is reduced in a head drum assembly of a video cassette recorder and thereby reducing a unit cost in manufacturing.

It is a further object of the present invention to provide a method for precisely controlling a rotational speed of a motor by using the driving apparatus in a head drum assembly of a video cassette recorder.

In order to achieve the above objects, the present invention provides a control method for driving a head drum assembly of a video cassette recorder, which comprises the steps of:

(i) providing a test current to each of magnetic coils having a phase thereof in an initial halt state of a motor of a head drum assembly while an operating mode is set for a video tape recorder;

(ii) generating an impulse detection signal while a displacement of a hall sensor is produced with respect to magnetic fluxes generated from impulse generation magnets installed on N and P magnetic poles alternately disposed and included in a plurality of frequency generator magnets installed on an inner peripheral surface of a frame of a rotor included in said motor, and detecting an initial switching position of said rotor based on the impulse detection signal;

(iii) comparing a zero-crossing signal obtained by executing a zero-crossing detecting process with respect to the impulse detection signal generated in step (ii) with a count signal obtained by counting a pulse number of the impulse detection signal, determining a next drive order of switching means for driving said motor with reference to a present position of rotary magnets of said rotor, and computing a signal for controlling a rotational speed of said motor based on a determined drive order;

(iv) whether both the determination of the drive order and the computation operation of the rotational speed of said motor currently proceeding in step (iii), are completed or not; and (v) providing an exciting current to a relevant magnetic coil installed in a stator of said motor in accordance with the drive order determined in step (iii) when it is judged in step (iv) that both the determination of the drive order and the computation operation of the rotational speed control signal are completed, and controlling the rotational speed of said motor to a predetermined speed based on the rotational speed control signal computed in step (iii).

In order to achieve the above objects, the present invention provides an apparatus for driving a head drum assembly of a video cassette recorder, which comprises:

a hall sensor for detecting magnetic fluxes supplied from impulse generation magnets installed on N and P magnetic poles of a plurality of frequency generator magnets secured onto an inner peripheral surface of a frame of a rotor included in a head drum assembly, and for providing an impulse detection signal;

amplifying means for amplifying the impulse detection signal from said hall sensor to a predetermined signal level and for providing an amplified impulse detection signal;

bit counting means for refining a waveform of an amplified impulse detection signal from said amplifying means and for providing a count signal;

integrating means for integrating an amplified impulse detection signal from said amplifying means and for providing an integrated impulse detection amplification signal;

zero-crossing detecting means for detecting zero-cross time points of an integrated impulse detection amplification signal from said integrating means and for providing a detected zero-crossing signal;

driving control means for comparing the zero-crossing signal detected by said zero-crossing detecting means with the count signal from said bit counting means, for providing a signal to control a next drive order of means for driving a motor included in said head drum assembly with reference to a present position of rotary magnets secured onto the inner peripheral surface of the frame of said rotor, and for providing a signal to control a rotational speed of said motor based on a drive order control signal; and switching driving means for providing an exciting current to a relevant magnetic coil of a stator included in said motor in accordance with the drive order control signal from said driving control means, and for driving said motor in accordance with the rotational speed control signal from said driving control means.

In the control method and apparatus for driving a head drum assembly of a video cassette recorder according to the present invention, a number of the hall sensors for detecting a rotational position of the motor is reduced and thereby reducing a unit cost of manufacturing. Also, while a rotational positional of the motor is detected based on the impulse signal responsive to a variation of magnetic fluxes detected from the impulse generation magnets, the rotational speed of the motor is precisely controlled in accordance with a switching control signal determined in response to a detected rotational speed, and thereby improving an operating reliability of the motor.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENTS

A description will be given below in detail with reference to accompanying drawings to a configuration and an operation of a control method and an apparatus for driving a head drum assembly of a video cassette recorder according to embodiments of the present invention.

Figure 3:
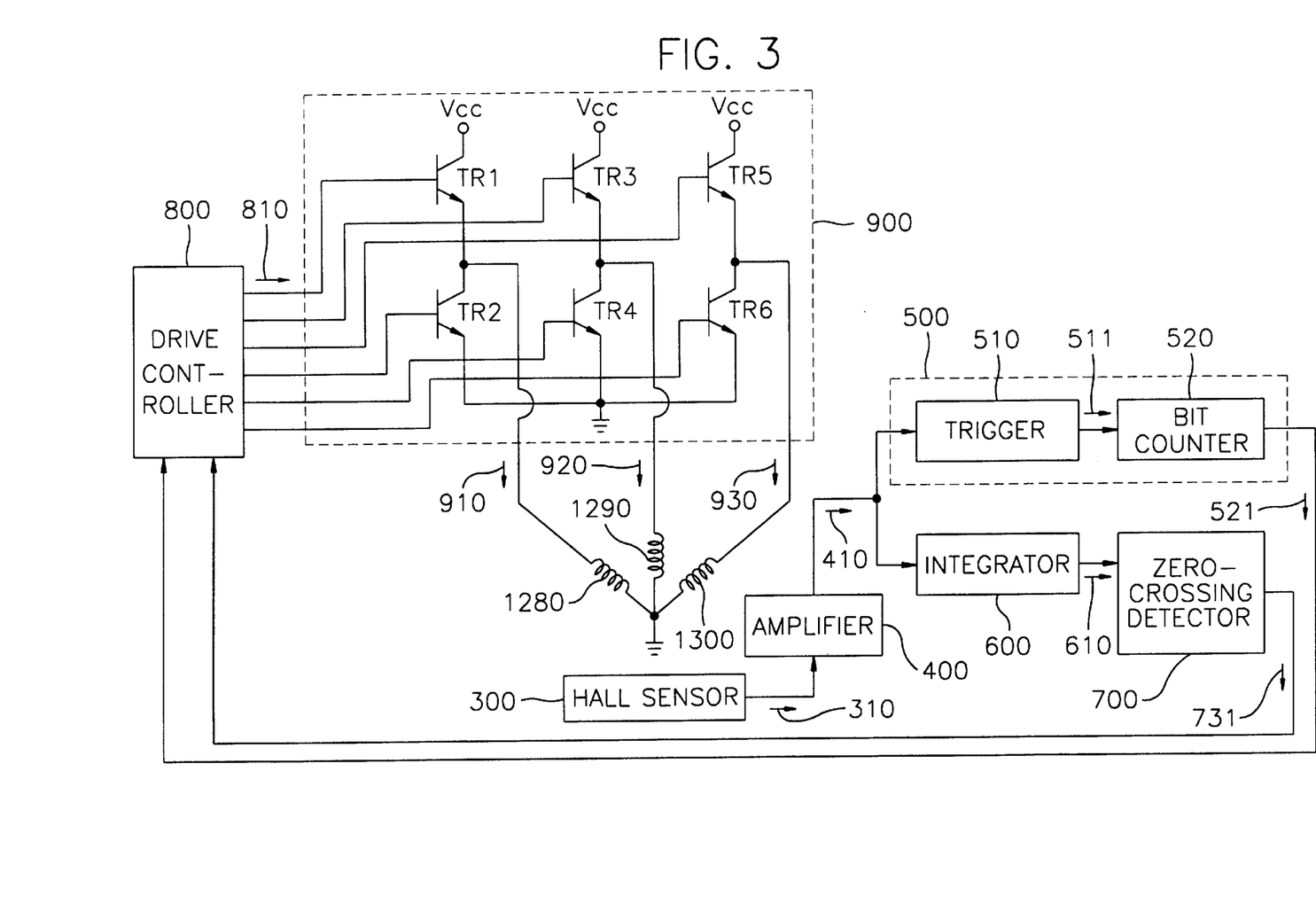
FIG. 3 is a block diagram for showing a circuit configuration of a driving apparatus of a head drum assembly according to an embodiment of the present invention.

FIG. 3 is a block diagram for showing a circuit configuration of a driving apparatus of a head drum assembly according to an embodiment of the present invention. As shown in FIG. 3, a driving apparatus of a head drum assembly according to an embodiment of the present invention includes a hall sensor 300, an amplifier 400, a trigger 510, a bit counter 520, an integrator 600, a zero-crossing detector 700, a driving controller 800 and a switching driving section 900. A reference numeral 500 denotes bit counting section which includes trigger 510 and bit counter 520.

Hall sensor 300 detects magnetic fluxes which are supplied from impulse generation magnets which are installed on N and P magnetic poles of a plurality of frequency generator magnets 1400 which are secured onto an inner peripheral surface of a frame of a rotor 1060 which is included in a head drum assembly 1000, and provides an impulse detection signal 310.

Amplifier 400 amplifies impulse detection signal 310 from hall sensor 300 to a predetermined signal level and provides an amplified impulse detection signal 410.

Trigger 510 refines a waveform of amplified impulse detection signal 410 from amplifier 400 and provides a waveform-refined impulse signal 511.

Bit counter 520 counts waveform-refined impulse signal 511 from trigger 510 and provides a count signal 521.

Integrator 600 integrates amplified impulse detection signal 410 from amplifier 400 and provides an integrated impulse detection amplification signal 610.

Zero-crossing detector 700 detects zero-cross time points of integrated impulse detection amplification signal 610 from integrator 600 and provides a detected zero-crossing signal 731.

Driving controller 800 compares zero-crossing signal 710 detected by zero20 crossing detector 700 with count signal 521 from bit counter 520 and provides a signal 810 to control a next drive order of a motor included in head drum assembly with reference to a present position of rotary magnets 1420 which are secured onto the inner peripheral surface of the frame of rotor 1060. At this time, driving controller 800 provides a signal 820 to control a rotational speed of rotor 1060 based on drive order control signal 810.

Switching driving section 900 respectively provides exciting currents 910, 920 and 930 to relevant magnetic coils 1280, 1290 and 1300 of a stator 1090 which is included in motor 1110 in accordance with drive order control signal 810 from driving controller 800, and drives motor 1110 in accordance with the rotational speed control signal 820 from driving controller 800. In FIG. 3, reference numerals 910, 920 and 930 denote first, second and third exciting currents, respectively. Reference numerals 1280, 1290 and 1300 denote first, second and third magnetic coils, respectively.

Figure 4:
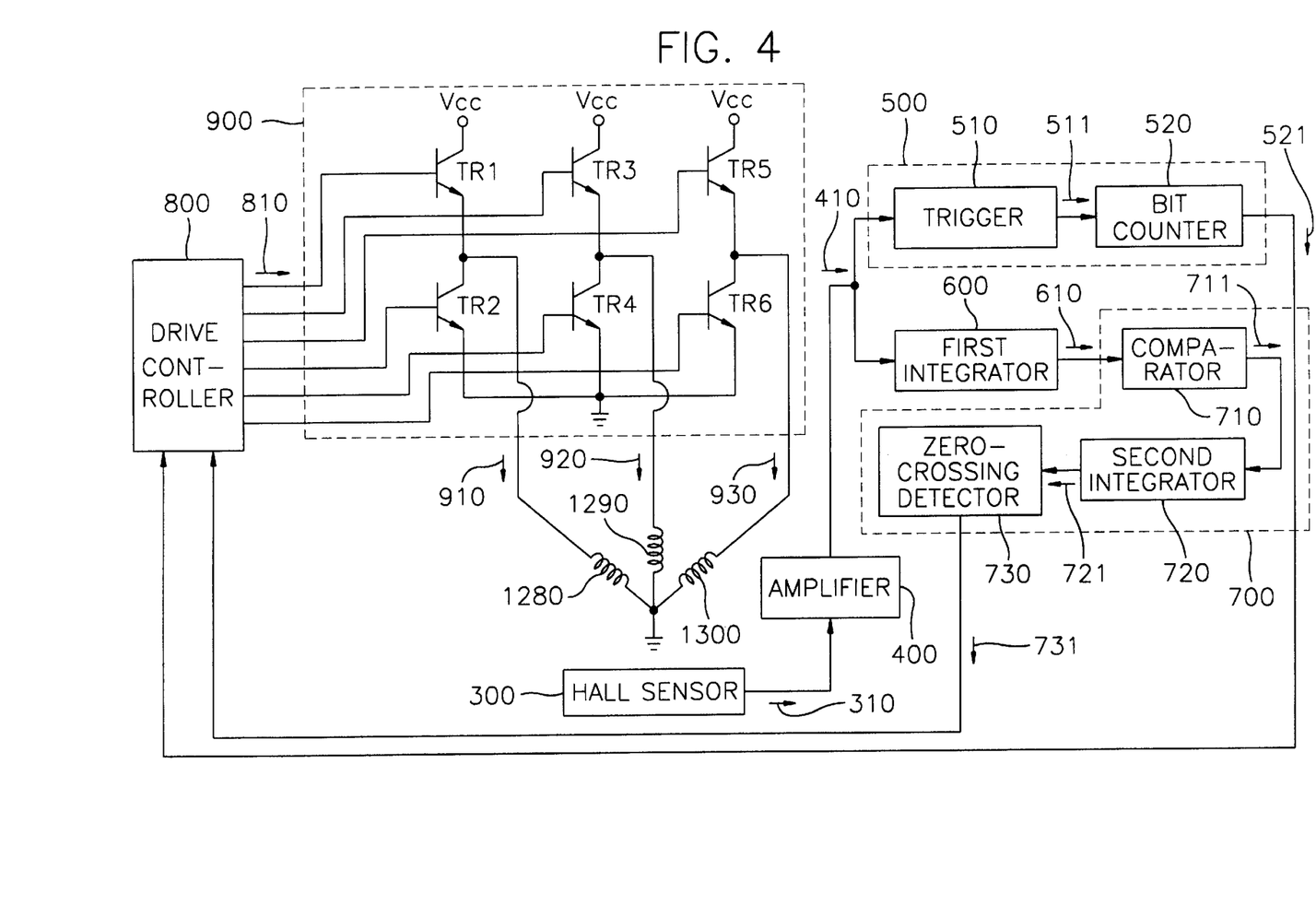
FIG. 4 is a block diagram for showing a circuit configuration of a driving apparatus of a head drum assembly according to another embodiment of the present invention.

FIG. 4 is a block diagram for showing a circuit configuration of a driving apparatus of a head drum assembly according to another embodiment of the present invention. As shown in FIG. 4, a driving apparatus of a head drum assembly according to another embodiment of the present invention has a circuit configuration wherein zero-crossing detector 700 included in an embodiment of the driving apparatus shown in FIG. 3 is replaced by a zero-crossing detecting section 700. Because the other circuit elements shown in FIG. 4 are the same as in FIG. 3, a circuit configuration of zero-crossing detecting section 700 is only described as follows.

Zero-crossing detecting section 700 includes a comparator 710, a second integrator 720 and a zero-crossing detector 730. In FIG. 4, a reference numeral 600 denotes a first integrator.

Comparator 710 shifts an integrated impulse detection amplification signal 610 from first integrator 600 by up to a predetermined period and provides a shifted signal 711.

Second integrator 720 integrates shifted signal 711 from comparator 710 and provides a pulse signal 721 for a speed detection.

Zero-crossing detector 730 detects zero-cross time points of pulse signal 721 for a speed detection from second integrator 720 and provides a detected zero-crossing signal 731.

Figure 5:
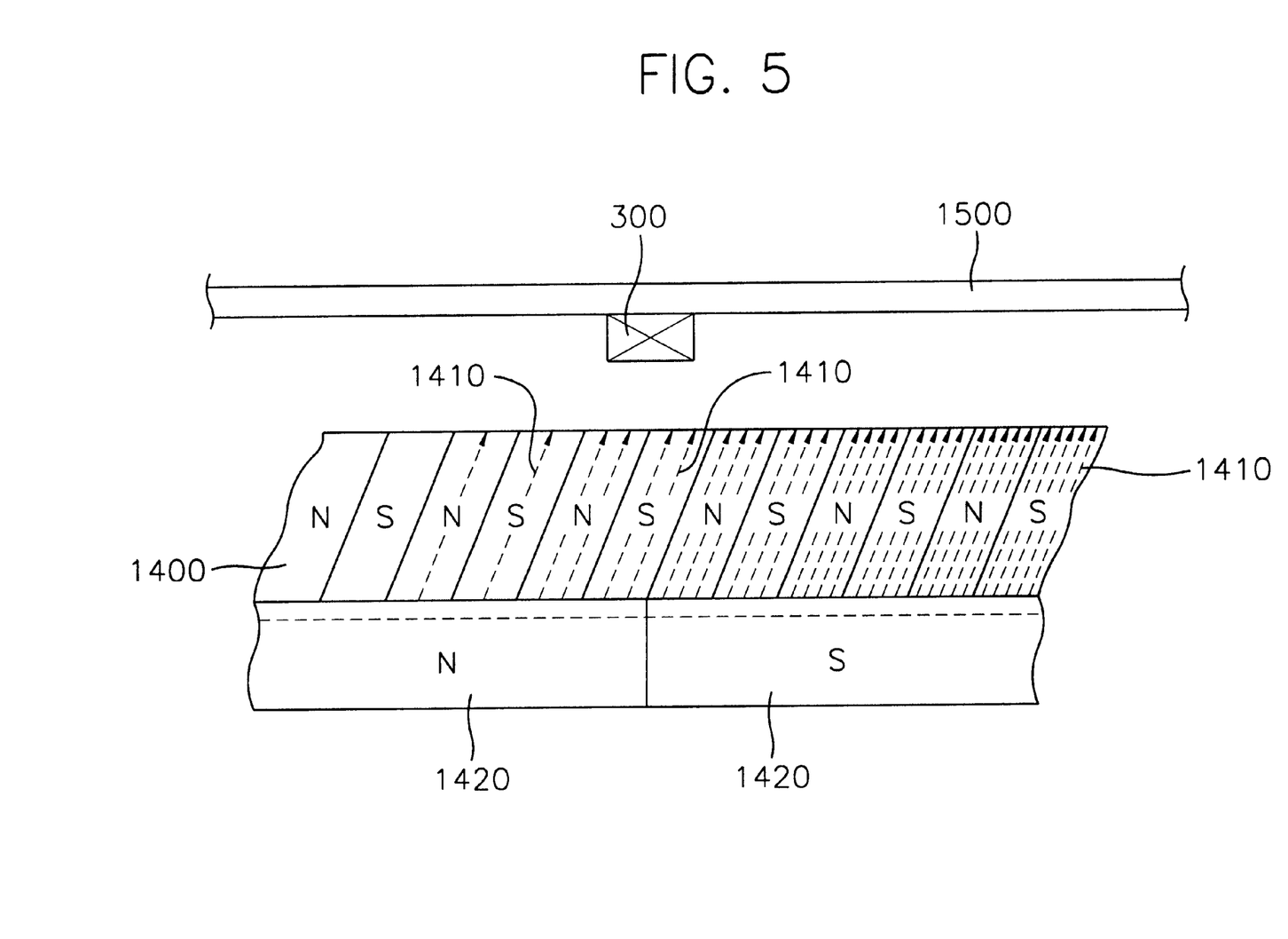
FIG. 5 is a schematic diagram for showing a structure in which impulse generation magnets are secured onto frequency generator magnets in a frame of a rotor included in the head drum assembly according to an embodiment of the present invention.

FIG. 5 is a schematic diagram for showing a structure in which impulse generation magnets are secured onto frequency generator magnets in a frame of a rotor included in the head drum assembly according to an embodiment of the present invention. As shown in FIG. 5, a plurality of FG magnets 1400 are securely installed onto the inner peripheral surface of the frame of rotor 1060, and the N and P magnetic poles thereof are alternately disposed. Impulse generation magnets 1410 are installed on the N and P magnetic poles in a pair of the N and P magnetic poles of a unit. One impulse generation magnet 1410 is installed respectively on a first pair of the N and P magnetic poles in a reference position. Next, two impulse generation magnets 1410 are installed respectively on a second pair of the N and P magnetic poles which are placed in the next position of the first pair of the N and P magnetic poles. Three impulse generation magnets 1410 are installed respectively on a third pair of the N and P magnetic poles which are placed in the next position of the second pair of the N and P magnetic poles. In this manner, five impulse generation magnets 1410 are installed respectively on a fifth pair of the N and P magnetic poles which are placed in the next position of the fourth pair of the N and P magnetic poles.

Figure 6:
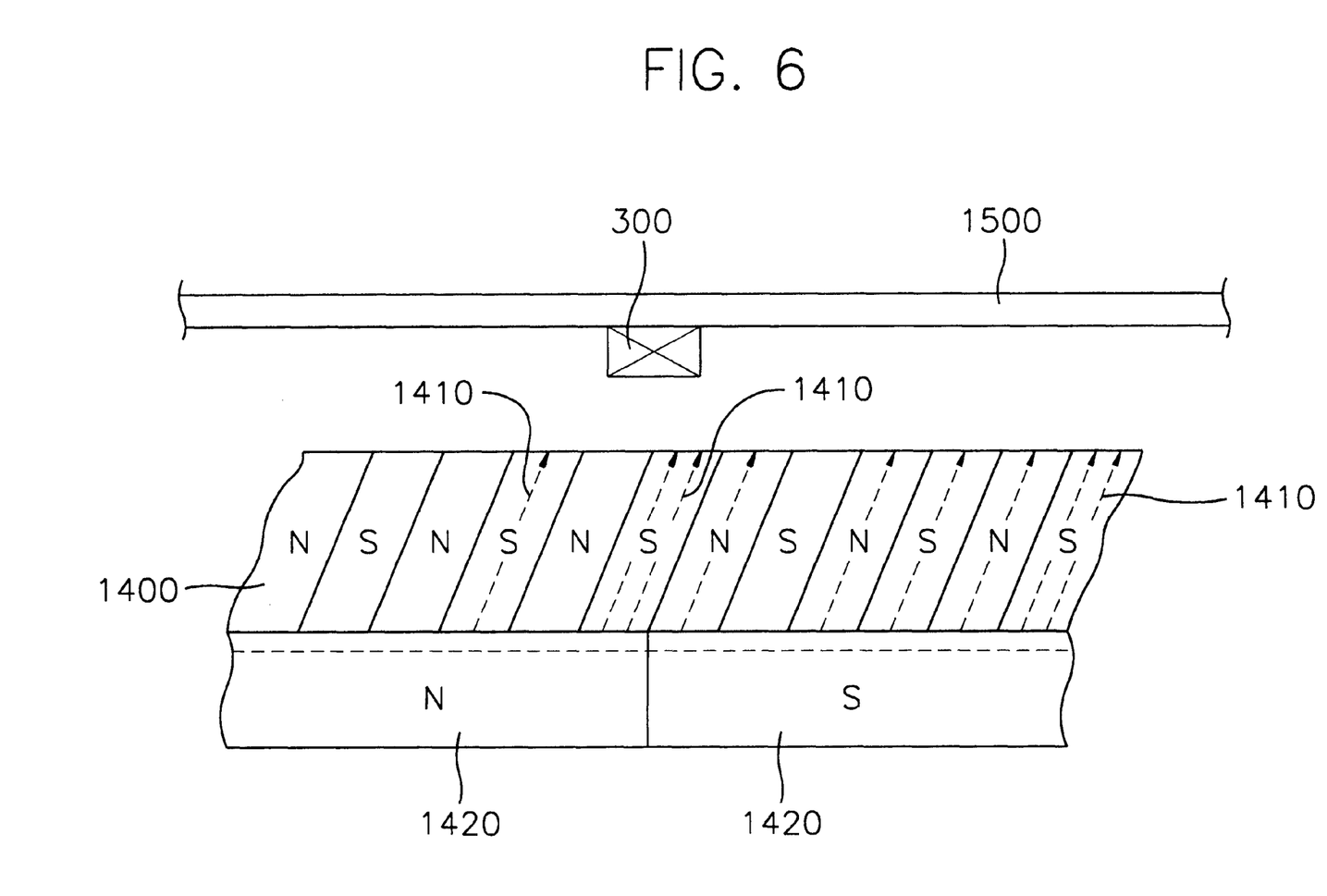
FIG. 6 is a schematic diagram for showing a structure in which impulse generation magnets are secured onto frequency generator magnets in a frame of a rotor included in the head drum assembly according to another embodiment of the present invention.

FIG. 6 is a schematic diagram for showing a structure in which impulse generation magnets are secured onto frequency generator magnets in a frame of a rotor included in the head drum assembly according to another embodiment of the present invention. As shown in FIG. 6, a plurality of FG magnets 1400 are securely installed onto the inner peripheral surface of the frame of rotor 1060, and the N and P magnetic poles thereof are alternately disposed. No impulse generation magnet 1410 is installed, in a reference position, on a first S magnetic pole which is arranged within a predetermined section of FG magnets 1400. One impulse generation magnet 1410 is installed on a second S magnetic pole which is placed after the first S magnetic pole. Two impulse generation magnets 1410 are installed on a third S magnetic pole which is placed after the second S magnetic pole. No impulse generation magnet 1410 is installed, in a reference position, on first, second and third N magnetic poles which are arranged within a predetermined section of FG magnets 1400. One impulse generation magnet 1410 is installed on fourth, fifth and sixth N magnetic poles which are placed after the first, second and third N magnetic poles. Therefore, when magnetic forces of impulse generation magnets 1410 which are installed in this structure are detected by halls sensor 300, the magnetic forces are detected in a binary formation such as (0, 0), (0, 1), (0, 2), (1, 0), (1, 1), (1, 2), (0, 0).

Figure 7:
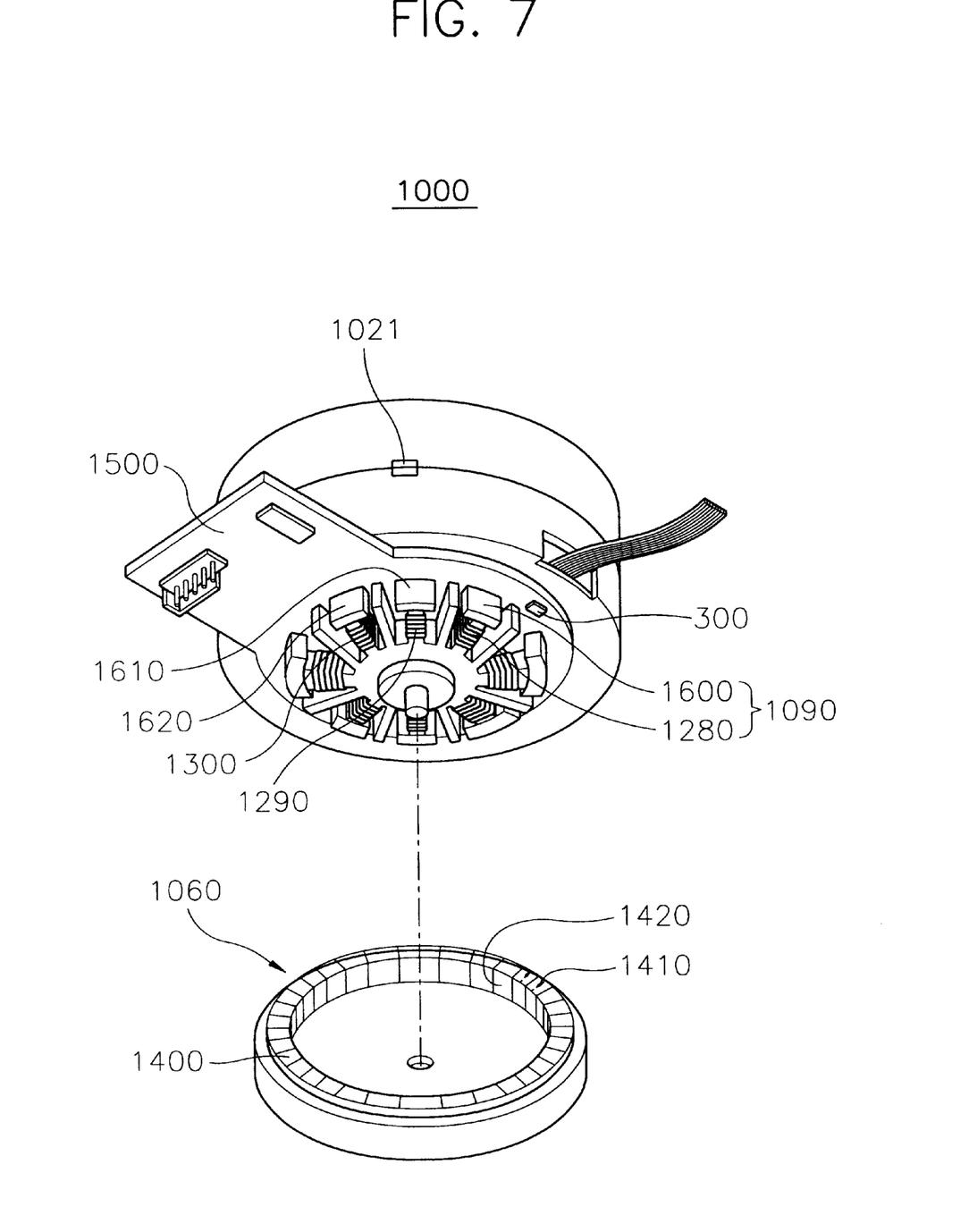
FIG. 7 is a perspective view for showing a structure of a head drum assembly which is driven by the driving apparatus shown in FIG. 3 or in FIG. 4, and to which the structure of installing the impulse generation magnets shown in FIG. 5 or in FIG. 6 is applied.

FIG. 7 is a perspective view for showing a structure of a head drum assembly which is driven by the driving apparatus shown in FIG. 3 or in FIG. 4, and to which the structure of installing the impulse generation magnets shown in FIG. 5 or in FIG. 6 is applied. As shown in FIG. 7, hall sensor 300 is installed onto a printed-circuit board 1500 which are securely installed onto a side of stator 1090, and is disposed on the opposite side to impulse generation magnets 1410 installed on FG magnets 1400 or to rotary magnets 1420. First to third magnetic coils 1280, 1290 and 1300 which are respectively wound at first to third cores 1600, 1610 and 1620, are installed on a side of stator 1090, and are disposed on the opposite side to rotary magnets 1420. Therefore, while an exciting current is provided from switching driving section 900 to a relevant magnetic coil under the control of driving controller 800, magnetic forces of rotary magnets 1420 repel or draw magnetic forces of the magnetic coils and rotor 1060 of motor 1110 then starts to rotate. As a result, while hall sensor 300 relatively rotates in an opposite position to impulse generation magnets 1410, data which is related to a position of rotor 1060 is provided to driving controller 800 via hall sensor 300 (refer to FIGS. 3 or 4).

A description will next be made on the procedure of the control method according to an embodiment of the present invention which is executed by the driving apparatus shown in FIG. 3, in accordance with the flowchart of FIG. 9, while referring to the timing chart of FIGS. 8A to 8C.

Figure 8A:
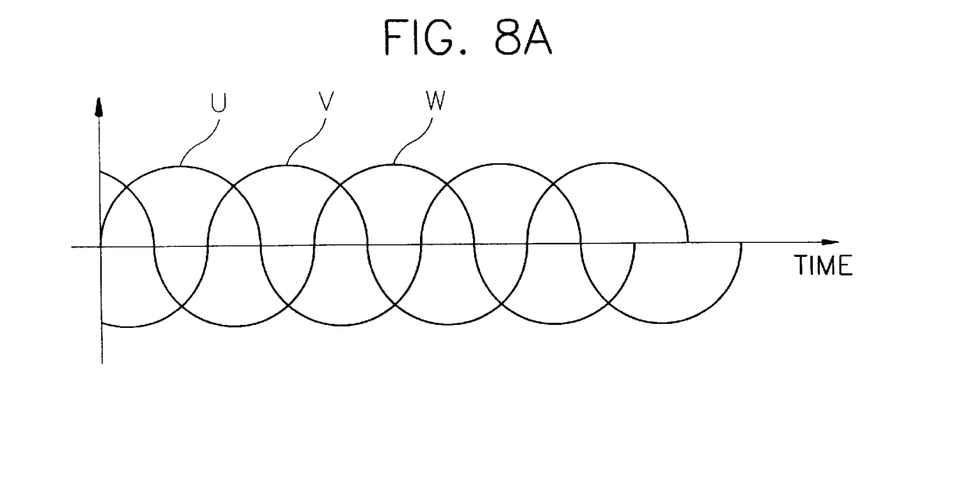
FIG. 8A is a timing chart for showing a phase of a rotor which is varied by an interaction between rotary magnets and magnetic coils installed on a stator side of the head drum assembly shown in FIG. 7.
Figure 8B:
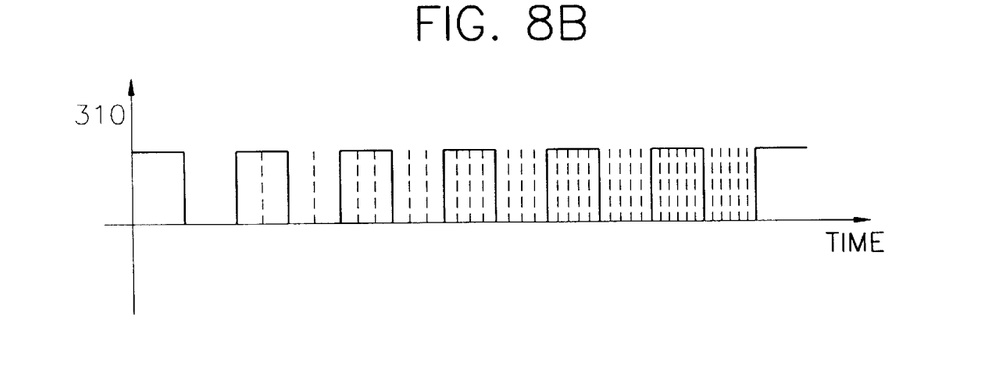
FIG. 8B is a timing chart for showing an impulse detection signal supplied from a hall sensor for detecting a variation of fluxes generated from the impulse generation magnets shown in FIG. 5.

FIG. 8A is a timing chart for showing a phase of a rotor which is varied by an interaction between rotary magnets and magnetic coils installed on a stator side of the head drum assembly shown in FIG. 7. FIG. 8B is a timing chart for showing an impulse detection signal supplied from a hall sensor for detecting a variation of fluxes generated from the impulse generation magnets shown in FIG. 5. FIG. 8C is a timing chart for showing a waveform which is produced by integrating the impulse detection signal shown in FIG. 8B.

Figure 9:
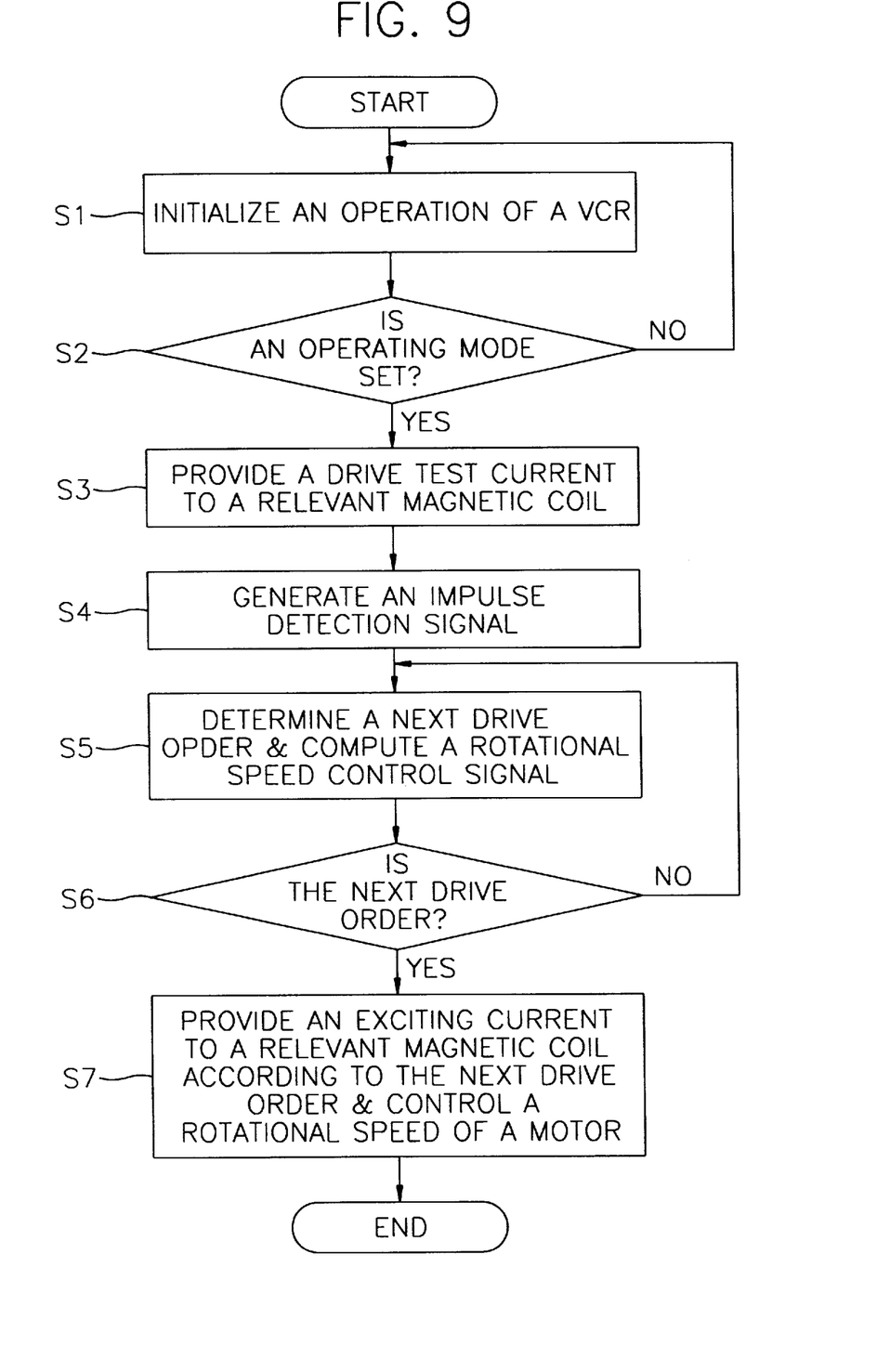
FIG. 9 is a flowchart for illustrating a control method which is performed by the driving apparatus shown in FIG. 3.

FIG. 9 is a flowchart for illustrating a control method which is performed by the driving apparatus shown in FIG. 3.

Furthermore, a description will next be made of the procedure of the control method according to another embodiment of the present invention which is executed by the driving apparatus shown in FIG. 4, in accordance with the flowchart of FIG. 11, while referring to the timing chart of FIGS. 10A to 10E.

Figure 10A:
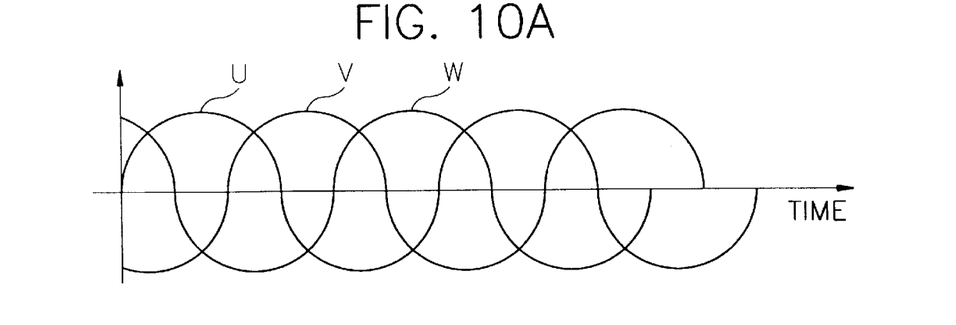
FIG. 10A is a timing chart for showing a phase variation responsive to a magnetic flux of a motor included in the head drum assembly shown in FIG. 7.
Figure 10B:
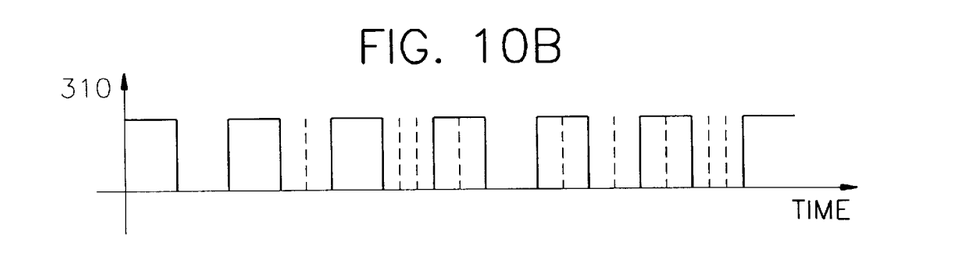
FIG. 10B is a timing chart for showing an impulse detection signal supplied from a hall sensor for detecting a variation of fluxes generated from the impulse generation magnets shown in FIG. 6.
Figure 10C:
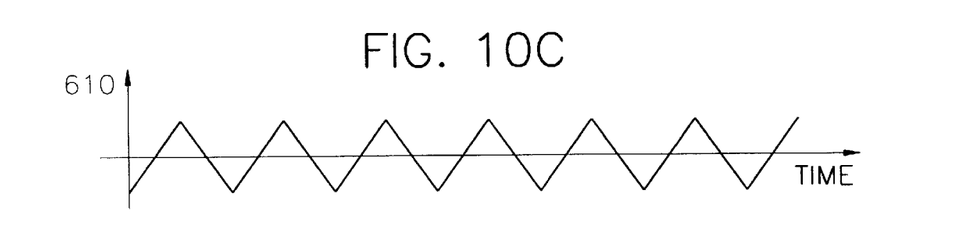
FIG. 10C is a timing chart for showing a waveform which is produced by integrating the impulse detection signal shown in FIG. 10B.
Figure 10D:
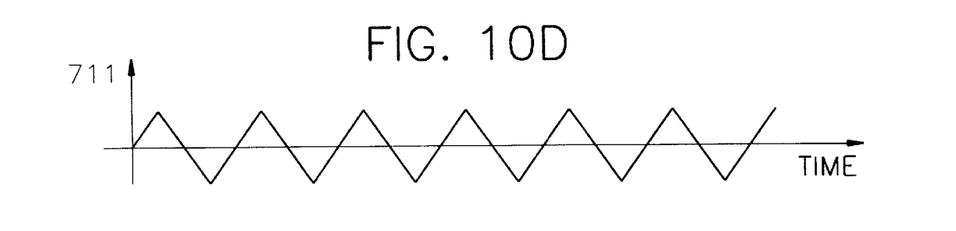
FIG. 10D is a timing chart for showing a waveform which is produced by shifting an integrated impulse detection signal shown in FIG. loC by up to a predetermined period on a time axis.
Figure 10E:
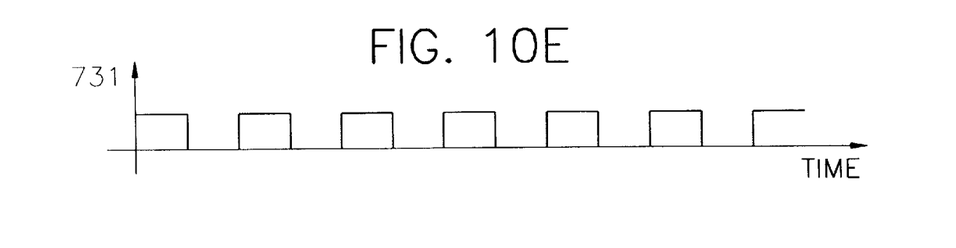
FIG. 10E is a timing chart for showing pulse signals having predetermined amplitude and time width which are generated width with reference to time points at which a shifted signal shown in FIG. 10D crosses a time axis.

FIG. 10A is a timing chart for showing a phase variation responsive to a magnetic flux of a motor included in the head drum assembly shown in FIG. 7. FIG. 10B is a timing chart for showing an impulse detection signal supplied from a hall sensor for detecting a variation of fluxes generated from the impulse generation magnets shown in FIG. 6. FIG. 10C is a timing chart for showing a waveform which is produced by integrating the impulse detection signal shown in FIG. 10B. FIG. 10D is a timing chart for showing a waveform which is produced by shifting an integrated impulse detection signal shown in FIG. 10C by up to a predetermined period on a time axis. FIG. 10E is a timing chart for showing pulse signals having predetermined amplitude and time width which are generated width with reference to time points at which a shifted signal shown in FIG. 10D crosses a time axis.

Figure 11:
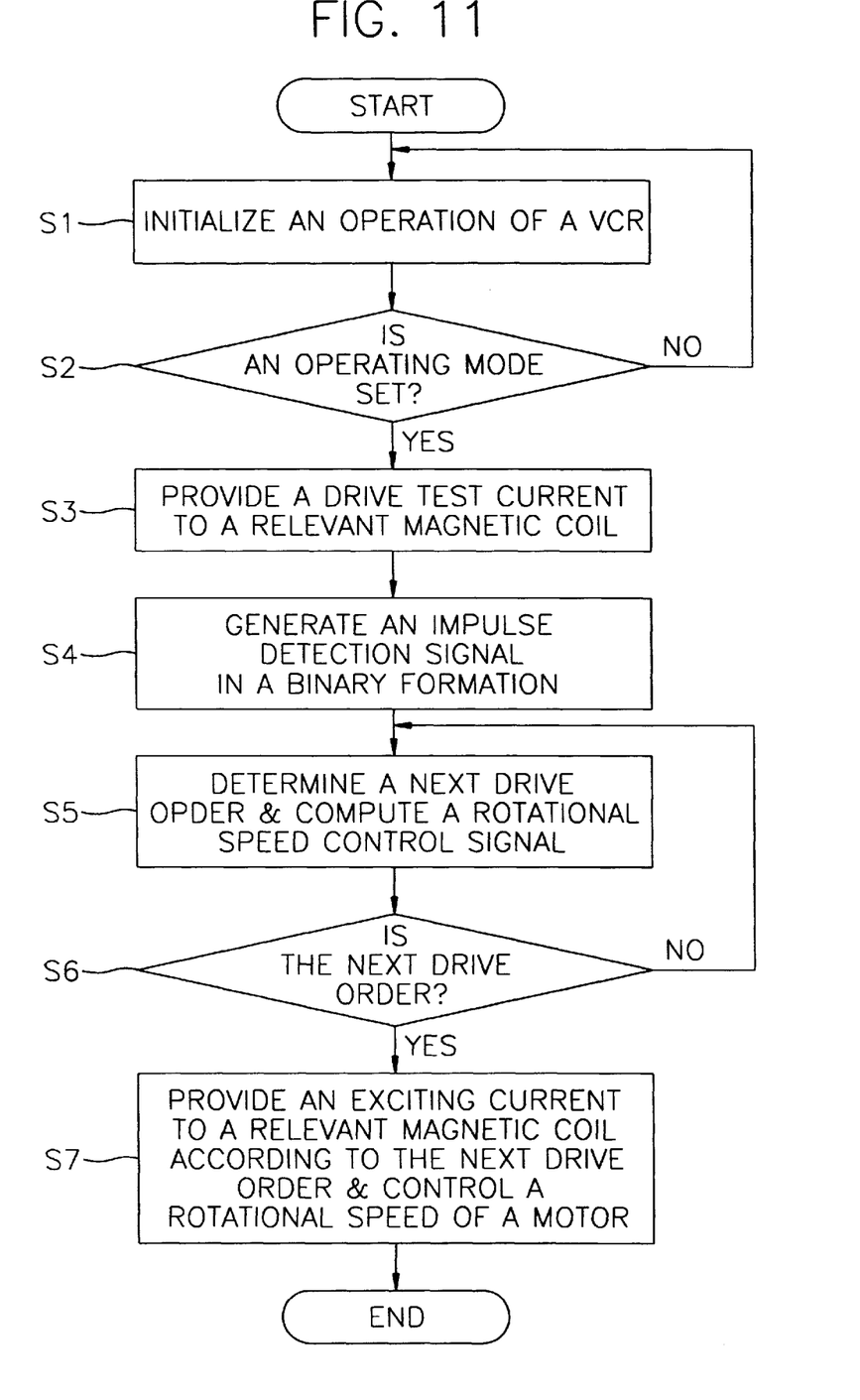
FIG. 11 is a flowchart for illustrating a control method which is performed by the driving apparatus shown in FIG. 4.

FIG. 11 is a flowchart for illustrating a control method which is performed by the driving apparatus shown in FIG. 4.

As illustrated in FIGS. 9 or 11, a procedure proceeds from an initialization state of an operation of the video cassette recorder (step S1) to step S2, and whether or not an operating mode of a video cassette recorder, e.g., a recording or reproducing mode, is set, is judged (step S2).

When it is judged in step S2 that the operating mode thereof is not set, the procedure returns to step S1. When the operating mode is set in step S2, a test current is provided to each of magnetic coils 1280, 1290 and 1300 having a phase thereof in an initial halt state of motor 1110 of head drum assembly 1000 (step S3).

For example, when a phase of rotor 1060 is U (refer to FIG. 8A), driving controller 800 turns on first and fourth transistors TR1 and TR4 via switching driving section 900, and also turns on third and second transistors TR3 and TR2 in order for first exciting current 910 having an opposite direction to flow through first magnetic coil 1280. When a phase of rotor 1060 is V (refer to FIG. 8A), driving controller 800 turns on third and sixth transistors TR3 and TR6 via switching driving section 900, and also turns on fifth and fourth transistors TR5 and TR4 in order for second exciting current 920 having an opposite direction to flow through a second magnetic coil 1290. When a phase of rotor 1060 is W (refer to FIG. 8A), driving controller 800 turns on fifth and second transistors TR5 and TR2 via switching driving section 900, and also turns on first and sixth transistors TR1 and TR6 in order for third exciting current 930 having an opposite direction to flow through a third magnetic coil 1300.

Therefore, while the magnetic flux is generated from the magnetic coil to which the exciting current is provided, rotary magnets 1420 of rotor 1060 are drawn by a generated magnetic flux and rotor 1060 rotates by up to a predetermined rotational angle. When rotor 1060 rotates with reference to stator 1090, hall sensor 300 which is installed on the side of stator 1090 relatively rotates with reference to rotor 1060. When hall sensor 300 starts to rotate, a interlinkage state of magnetic fluxes generated from impulse generation magnets 1410 securely installed onto FG magnets 1400 of rotor 1060, varies with respect to hall sensor 300. Accordingly, impulse detection signal 310 shown in FIG. 8B is provided from hall sensor 300 to amplifier 400 (refer to FIG. 3; step S4). Also, in step S4, an initial switching position of rotor 1060 is sensed by driving controller 800 on the basis of impulse detection signal 310.

In the control method according to an embodiment of the present invention, impulse detection signal 310 is amplified to a predetermined signal level by amplifier 400, and then passes through trigger 510 and bit counter 520 sequentially. Amplified impulse detection signal 410 is refined in the waveform thereof by trigger 510, and a number of pulses of waveform-refmed impulse signal 511 is counted by bit counter 520. Count signal 521 from bit counter 520 is provided to driving controller 800. For example, when three impulse generation magnets 1410 are installed on FG magnets 1400, three pulses are detected by hall sensor 300 and bit counter 520 provides count signal 521 corresponding to 4 bits.

Figure 8C:
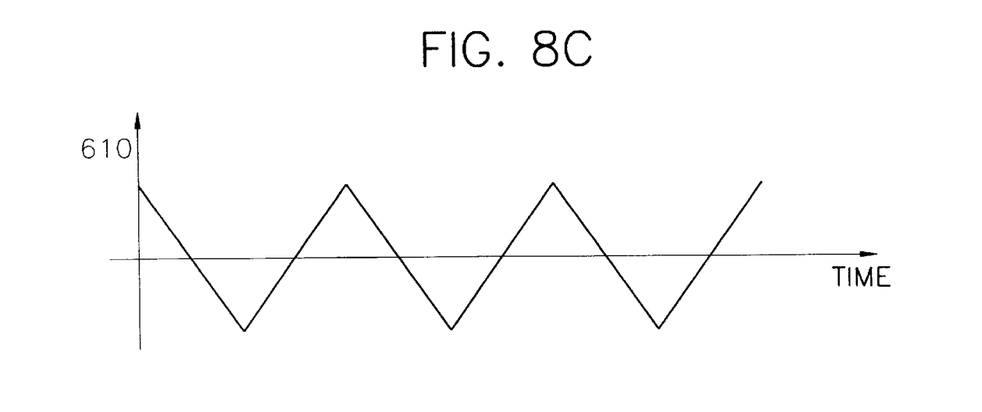
FIG. 8C is a timing chart for showing a waveform which is produced by integrating the impulse detection signal shown in FIG. 8B.

Also, amplified impulse detection signal 410 is integrated by integrator 600 and integrated impulse detection amplification signal 610 shown in FIG. 8C is provided to zero-crossing detector 700. Time points at which integrated impulse detection amplification signal 610 crosses a time axis are detected by zero-crossing detector 700, and pulse signals which have predetermined amplitude and time width with reference to the time points based on this detection result, are provided to driving controller 800.

In the control method according to another embodiment of the present invention, impulse detection signal 310 which has a binary formation as shown in FIG. 10B is detected by hall sensor 300 in step S4. For example, impulse detection signal 310 has the binary formation such as (0, 0), (0, 1), (0, 2), (1, 0), (1, 1), (1, 2), (0, 0). Impulse detection signal 310 is amplified to a predetermined signal level by amplifier 400, and then passes through trigger 510 and bit counter 520 sequentially. Amplified impulse detection signal 410 is refined in the waveform thereof by trigger 510, and a number of pulses of waveform-refmed impulse signal 511 is counted by bit counter 520. Count signal 521 from bit counter 520 is provided to driving controller 800. For example, when two impulse generation magnets 1410 are installed on FG magnets 1400, two pulses are detected by hall sensor 300 and bit counter 520 provides count signal 521 corresponding to 2 bits.

Also, amplified impulse detection signal 410 is integrated by first integrator 600 and integrated impulse detection amplification signal 610 shown in FIG. 10C is provided to comparator 710. Integrated impulse detection amplification signal 610 is shifted by up to a predetermined period by comparator 710. Shifted signal 711 (refer to FIG. 10D) is integrated by second integrator 720 and is provided to zero-crossing detector 730 as pulse signal 721 for a speed detection. Time points at which pulse signal 721 for a speed detection crosses a time axis are detected by zero-crossing detector 700, and pulse signals (refer to FIG. 10E) which have predetermined amplitude and time width with reference to the time points based on this detection result are provided to driving controller 800.

In step S5, driving controller 800 judges how many pulses from bit counter 520 exists among zero points which correspond to the phases of rotor 1060 (refer to FIG. 8A) and which is supplied from zero-crossing detector 700 in step S4, and determines the phase of rotor 1060 which currently operates. Based on the determined phase, driving controller 800 determines the drive order for magnetic coil to which the exciting current is supplied at the next time.

In the control method according to an embodiment of the present invention, when a current impulse detection signal 310 has a value of (3, 3) on the condition where impulse detection signal 310 is defined as having a value of (2, 2) in the last drive order for first magnetic coil 1280 corresponding to the U phase of rotor 1060, and is defined as having a value of (3, 3) with respect to magnetic coil 1290 of the V phase corresponding to the next drive order, driving controller 800 recognizes that a current phase rotary magnets 1420 of rotor 1060 corresponds to magnetic coil 1280 of the U phase, and determines to drive magnetic coil 1290 of the V phase. Namely, drive order control signal 810 is determined. Driving controller 800 computes a signal 820 for controlling the rotational speed of rotor 1060 in accordance with drive order control signal 810 (step S5).

In the control method according to another embodiment of the present invention, when a current impulse detection signal 310 has a value of (0, 2) on the condition where impulse detection signal 310 is defined as having a value of (0, 2) in the last drive order for first magnetic coil 1280 corresponding to the U phase of rotor 1060, and is defined as having a value of (1, 0) with respect to magnetic coil 1290 of the V phase corresponding to the next drive order, driving controller 800 recognizes that a current phase rotary magnets 1420 of rotor 1060 corresponds to magnetic coil 1280 of the U phase, and determines to drive magnetic coil 1290 of the V phase. Namely, drive order control signal 810 is determined. Driving controller 800 computes a signal 820 for controlling the rotational speed of rotor 1060 in accordance with drive order control signal 810 (step S5).

In step S6, whether both the determination of the drive order and the computation operation of rotational speed control signal 820 of motor 1110 currently proceeding in step S5 is completed or not, is judged.

When it is judged in step S6 that both the determination of the drive order and the computation operation of the rotational speed control signal are not completed, the procedure returns to step S5.

When it is judged in step S6 that both the determination of the drive order and the computation operation of the rotational speed control signal are completed, providing exciting currents 910, 920 and 930 to relevant magnetic coils 1280, 1290 and 1300 of stator 1090 in accordance with the next drive order determined in step S5, and the rotational speed of rotor 1060 is controlled by driving controller 800 to a predetermined speed based on rotational speed control signal 820 which is computed in step S5.

In the control method and apparatus for driving a head drum assembly of a video cassette recorder according to the present invention, a number of the hall sensors for detecting a rotational position of the motor is reduced, thereby reducing a unit cost of manufacturing. Also, while a displacement of a hall sensor installed on the stator side is produced with respect to magnetic fluxes generated from impulse generation magnets installed on the frequency generator magnets of the rotor, the impulse detection signal is supplied from the hall sensor. After the zero-crossing signal obtained by executing a zero-crossing detecting process with respect to the impulse detection signal is compared, by the driving controller, with the count signal obtained by counting the pulse number of the impulse detection signal, the next drive order of a switching section for driving the motor with reference to a present position of the rotary magnets of the rotor is determined, and the rotational position of the motor is precisely controlled according to the rotational speed control signal which is computed on the basis of the determined drive order. Consequently, an operating reliability of the motor is improved.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A control method for driving a head drum assembly of a video cassette recorder, said method comprising the steps of:

(i) providing a test current to each of magnetic coils having a phase thereof in an initial halt state of a motor of a head drum assembly while an operating mode is set for a video tape recorder;

(ii) generating an impulse detection signal while a displacement of a hall sensor is produced with respect to magnetic fluxes generated from impulse generation magnets installed on N and P magnetic poles alternately disposed and included in a plurality of frequency generator magnets installed on an inner peripheral surface of a frame of a rotor included in said motor, and detecting an initial switching position of said rotor based on the impulse detection signal;

(iii) comparing a zero-crossing signal obtained by executing a zero-crossing detecting process with respect to the impulse detection signal generated in step (ii) with a count signal obtained by counting a pulse number of the impulse detection signal, determining a next drive order of switching means for driving said motor with reference to a present position of rotary magnets of said rotor, and computing a signal for controlling a rotational speed of said motor based on a determined drive order;

(iv) judging whether both the determination of the drive order and the computation operation of the rotational speed of said motor currently proceeding in step (iii), are completed or not; and (v) supplying providing an exciting current to a relevant magnetic coil installed in a stator of said motor in accordance with the drive order determined in step (iii) when it is judged in step (iv) that both the determination of the drive order and the computation operation of the rotational speed control signal are completed, and controlling the rotational speed of said motor to a predetermined speed based on the rotational speed control signal computed in step (iii).

2. The control method for driving a head drum assembly of a video cassette recorder as claimed in claim 1, further comprising the steps of:

returning to an initialization state of said video cassette recorder when the operating mode thereof is not set.

3. The control method for driving a head drum assembly of a video cassette recorder as claimed in claim 1, further comprising the steps of:

returning to step (iii) when it is judged in step (iv) that both the determination of the drive order and the computation operation of the rotational speed control signal are not completed.

4. The control method for driving a head drum assembly of a video cassette recorder as claimed in claim 1, wherein said impulse detection signal supplied from said hall sensor has a binary formation.

5. An apparatus for driving a head drum assembly of a video cassette recorder, said apparatus comprising:

a hall sensor for detecting magnetic fluxes supplied from impulse generation magnets installed on N and P magnetic poles of a plurality of frequency generator magnets secured onto an inner peripheral surface of a frame of a rotor included in a head drum assembly, and for providing an impulse detection signal;

amplifying means for amplifying the impulse detection signal from said hall sensor to a predetermined signal level and for providing an amplified impulse detection signal;

bit counting means for refining a waveform of an amplified impulse detection signal from said amplifying means and for providing a count signal;

integrating means for integrating an amplified impulse detection signal from said amplifying means and for providing an integrated impulse detection amplification signal;

zero-crossing detecting means for detecting zero-cross time points of an integrated impulse detection amplification signal from said integrating means and for providing a detected zero-crossing signal;

driving control means for comparing the zero-crossing signal detected by said zero-crossing detecting means with the count signal from said bit counting means, for providing a signal to control a next drive order of means for driving a motor included in said head drum assembly with reference to a present position of rotary magnets secured onto the inner peripheral surface of the frame of said rotor, and for providing a signal to control a rotational speed of said motor based on a drive order control signal; and switching driving means for providing an exciting current to a relevant magnetic coil of a stator included in said motor in accordance with the drive order control signal from said driving control means, and for driving said motor in accordance with the rotational speed control signal from said driving control means.

6. The apparatus for driving a head drum assembly of a video cassette recorder as claimed in claim 5, wherein said bit counting means comprises:

a trigger for refining a waveform of an amplified impulse detection signal from said amplifying means and for providing a waveform-refined impulse signal; and a bit counter for counting the waveform-refined impulse signal from said trigger and for providing a count signal.

7. The apparatus for driving a head drum assembly of a video cassette recorder as claimed in claim 5, wherein said zero-crossing detecting means comprises:

a comparator for shifting an integrated impulse detection amplification signal from said integrating means by up to a predetermined period and for providing a shifted signal;

an integrator for integrating the shifted signal from said comparator and for providing a pulse signal for a speed detection; and a zero-crossing detector for detecting zero-cross time points of the pulse signal for a speed detection from said integrator and for providing a detected zero-crossing signal.

8. The apparatus for driving a head drum assembly of a video cassette recorder as claimed in claim 5, wherein said impulse generation magnets are installed in a pair of the N and P magnetic poles of unit on the N and P magnetic poles alternately disposed and included in the plurality of frequency generator magnets installed on the inner peripheral surface of the frame of said rotor, a number of said impulse generation magnets respectively installed on the pair of the N and P magnetic poles is the same, said number of said impulse generation magnets sequentially increasing by up to a predetermined number, and said impulse generation magnets are installed within a predetermined section of said frequency generator magnets.

9. The apparatus for driving a head drum assembly of a video cassette recorder as claimed in claim 8, wherein said predetermined number is one.

10. The apparatus for driving a head drum assembly of a video cassette recorder as claimed in claim 5, wherein said impulse generation magnets are installed on the S magnetic pole arranged within a predetermined section of the N and P magnetic poles alternately disposed and included in the plurality of frequency generator magnets installed on the inner peripheral surface of the frame of said rotor, a number of said impulse generation magnets sequentially increasing by up to a first predetermined number, and said impulse generation magnets are not installed on the N magnetic poles arranged by up to a second predetermined number thereof from a start position but are installed only on the N magnetic poles arranged in the next position by up to a second predetermined number thereof.

11. The apparatus for driving a head drum assembly of a video cassette recorder as claimed in claim 10, wherein said first and second predetermined numbers are one and three, respectively.

12. A control method for driving a head drum assembly of a video cassette recorder, said method comprising the steps of:

(i) judging whether or not an operating mode of a video cassette recorder is set in an initialization state thereof;

(ii) returning to an initialization state of said video cassette recorder when the operating mode thereof is not set in step (i);

(iii) providing a test current to each of magnetic coils having a phase thereof in an initial halt state of a motor of a head drum assembly when the operating mode is set in step (i);

(iv) generating an impulse detection signal while a displacement of a hall sensor is produced with respect to magnetic fluxes generated from impulse generation magnets installed on N and P magnetic poles alternately disposed and included in a plurality of frequency generator magnets installed on an inner peripheral surface of a frame of a rotor included in said motor, and detecting an initial switching position of said rotor based on the impulse detection signal;

(v) comparing a zero-crossing signal obtained by executing a zero-crossing detecting process with respect to the impulse detection signal generated in step (ii) with a count signal obtained by counting a pulse number of the impulse detection signal, determining a next drive order of switching means for driving said motor with reference to a present position of rotary magnets of said rotor, and computing a signal for controlling a rotational speed of said motor based on a determined drive order;

(vi) judging whether both the determination of the drive order and the computation operation of the rotational speed of said motor currently proceeding in step (v), are completed or not;

(vii) returning to step (v) when it is judged in step (vi) that both the determination of the drive order and the computation operation of the rotational speed control signal are not completed;

(viii) supplying providing an exciting current to a relevant magnetic coil installed in a stator of said motor in accordance with the drive order determined in step (v) when it is judged in step (vi) that both the determination of the drive order and the computation operation of the rotational speed control signal are completed; and (ix) controlling the rotational speed of said motor to a predetermined speed based on the rotational speed control signal computed in step (v).

13. The control method for driving a head drum assembly of a video cassette recorder as claimed in claim 12, wherein said impulse detection signal supplied from said hall sensor has a binary formation.

14. An apparatus for driving a head drum assembly of a video cassette recorder, said apparatus comprising:

a hall sensor for detecting magnetic fluxes supplied from impulse generation magnets installed on N and P magnetic poles of a plurality of frequency generator magnets secured onto an inner peripheral surface of a frame of a rotor included in a head drum assembly, and for providing an impulse detection signal;

an amplifier for amplifying the impulse detection signal from said hall sensor to a predetermined signal level and for providing an amplified impulse detection signal;

a trigger for refining a waveform of an amplified impulse detection signal from said amplifier and for providing a waveform-refmed impulse signal;

a bit counter for counting the waveform-refined impulse signal from said trigger and for providing a count signal;

an integrator for integrating an amplified impulse detection signal from said amplifier and for providing an integrated impulse detection amplification signal;

a zero-crossing detector for detecting zero-cross time points of an integrated impulse detection amplification signal from said integrator and for providing a detected zero-crossing signal;

a driving controller for comparing the zero-crossing signal detected by said zero-crossing detector with the count signal from said bit counter, for providing a signal to control a next drive order a motor included in said head drum assembly with reference to a present position of rotary magnets secured onto the inner peripheral surface of the frame of said rotor, and for providing a signal to control a rotational speed of said motor based on a drive order control signal; and a switching driving section for providing an exciting current to a relevant magnetic coil of a stator included in said motor in accordance with the drive order control signal from said driving controller, and for driving said motor in accordance with the rotational speed control signal from said driving controller.

15. The apparatus for driving a head drum assembly of a video cassette recorder as claimed in claim 14, wherein said impulse generation magnets are installed in a pair of the N and P magnetic poles of unit on the N and P magnetic poles alternately disposed and included in the plurality of frequency generator magnets installed on the inner peripheral surface of the frame of said rotor, a number of said impulse generation magnets respectively installed on the pair of the N and P magnetic poles is the same, said number of said impulse generation magnets sequentially increasing by up to one, and said impulse generation magnets are installed within a predetermined section of said frequency generator magnets.

16. An apparatus for driving a head drum assembly of a video cassette recorder, said apparatus comprising:

a hall sensor for detecting in a binary formation magnetic fluxes supplied from impulse generation magnets installed on N and P magnetic poles of a plurality of frequency generator magnets secured onto an inner peripheral surface of a frame of a rotor included in a head drum assembly, and for providing an impulse detection signal;

an amplifier for amplifying the impulse detection signal from said hall sensor to a predetermined signal level and for providing an amplified impulse detection signal;

a trigger for refining a waveform of an amplified impulse detection signal from said amplifier and for providing a waveform-refined impulse signal;

a bit counter for counting the waveform-refined impulse signal from said trigger and for providing a count signal;

a first integrator for integrating an amplified impulse detection signal from said amplifier and for providing an integrated impulse detection amplification signal;

a comparator for shifting an integrated impulse detection amplification signal from said first integrator by up to a predetermined period and for providing a shifted signal;

a second integrator for integrating the shifted signal from said comparator and for providing a pulse signal for a speed detection;

a zero-crossing detector for detecting zero-cross time points of the pulse signal for a speed detection from said second integrator and for providing a detected zero-crossing signal;

a driving controller for comparing the zero-crossing signal detected by said zero-crossing detector with the count signal from said bit counter, for providing a signal to control a next drive order of a motor included in said head drum assembly with reference to a present position of rotary magnets secured onto the inner peripheral surface of the frame of said rotor, and for providing a signal to control a rotational speed of said motor based on a drive order control signal; and a switching driving section for providing an exciting current to a relevant magnetic coil of a stator included in said motor in accordance with the drive order control signal from said driving controller, and for driving said motor in accordance with the rotational speed control signal from said driving controller.

17. The apparatus for driving a head drum assembly of a video cassette recorder as claimed in claim 16, wherein said impulse generation magnets are installed on the S magnetic pole arranged within a predetermined section of the N and P magnetic poles alternately disposed and included in the plurality of frequency generator magnets installed on the inner peripheral surface of the frame of said rotor, a number of said impulse generation magnets sequentially increasing by up to one, and said impulse generation magnets are not installed on the N magnetic poles arranged by up to three thereof from a start position but are installed only on the N magnetic poles arranged in the next position by up to three thereof.

\* \* \* \* \*